July 28, 1936.  W. J. ROEPKE  2,048,950
AIRCRAFT LIFT ROTOR AND ROTOR PACK
Filed Sept. 29, 1934  4 Sheets-Sheet 1
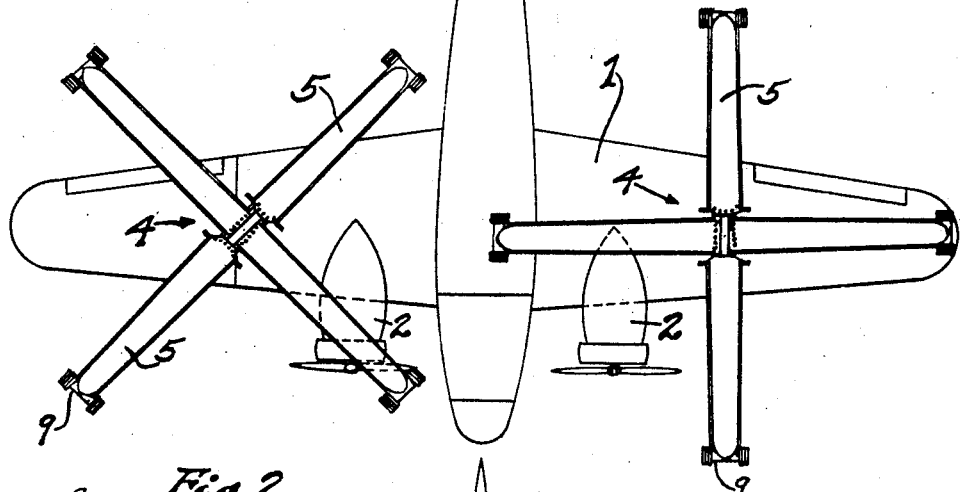
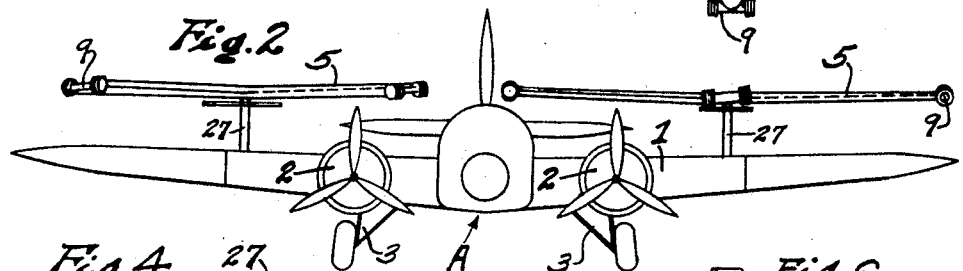
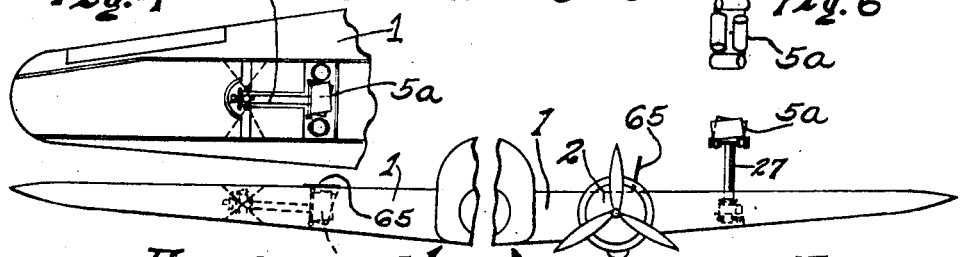
INVENTOR
WILLIAM JOHN ROEPKE
by John A. McDowell
his atty.

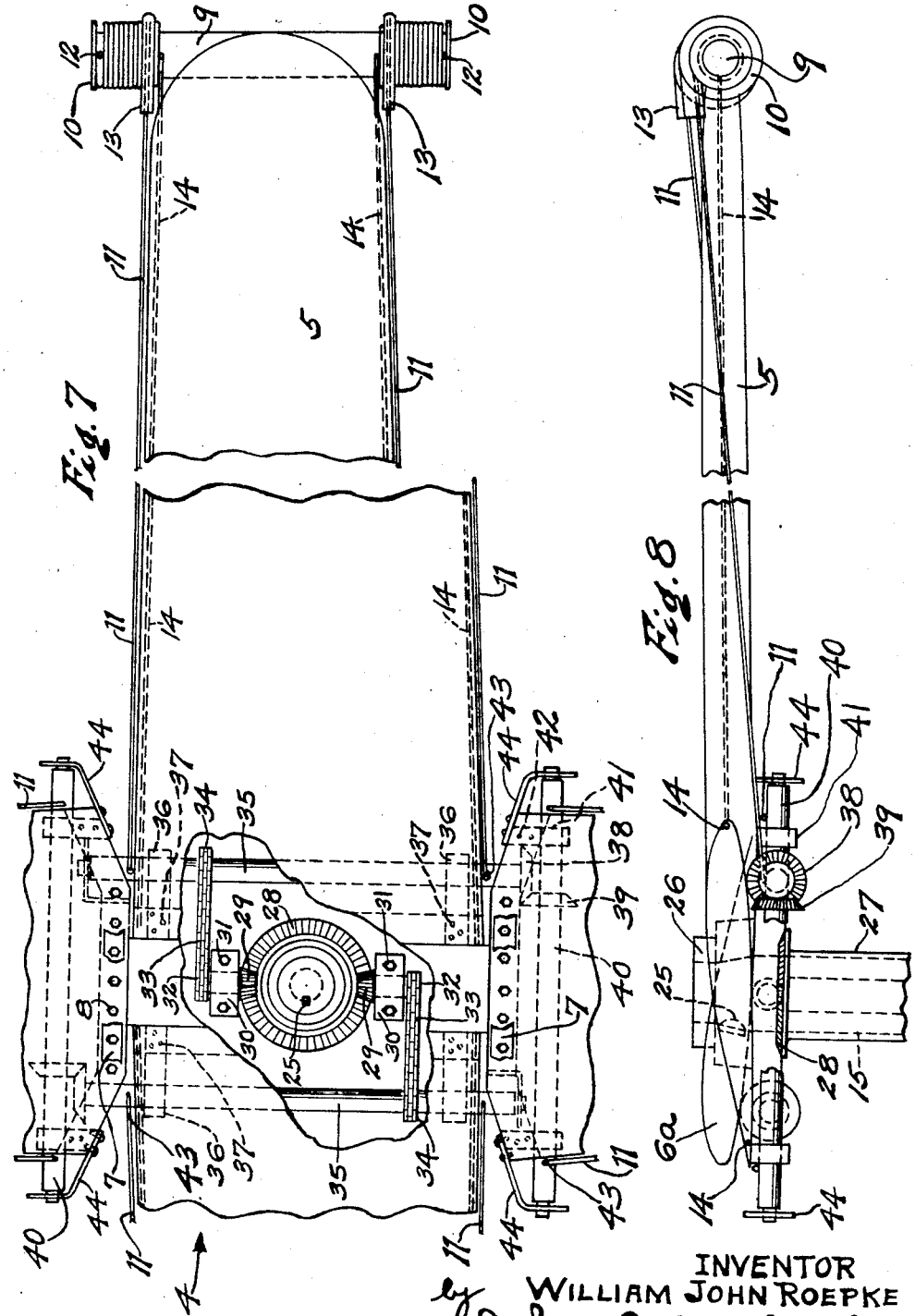

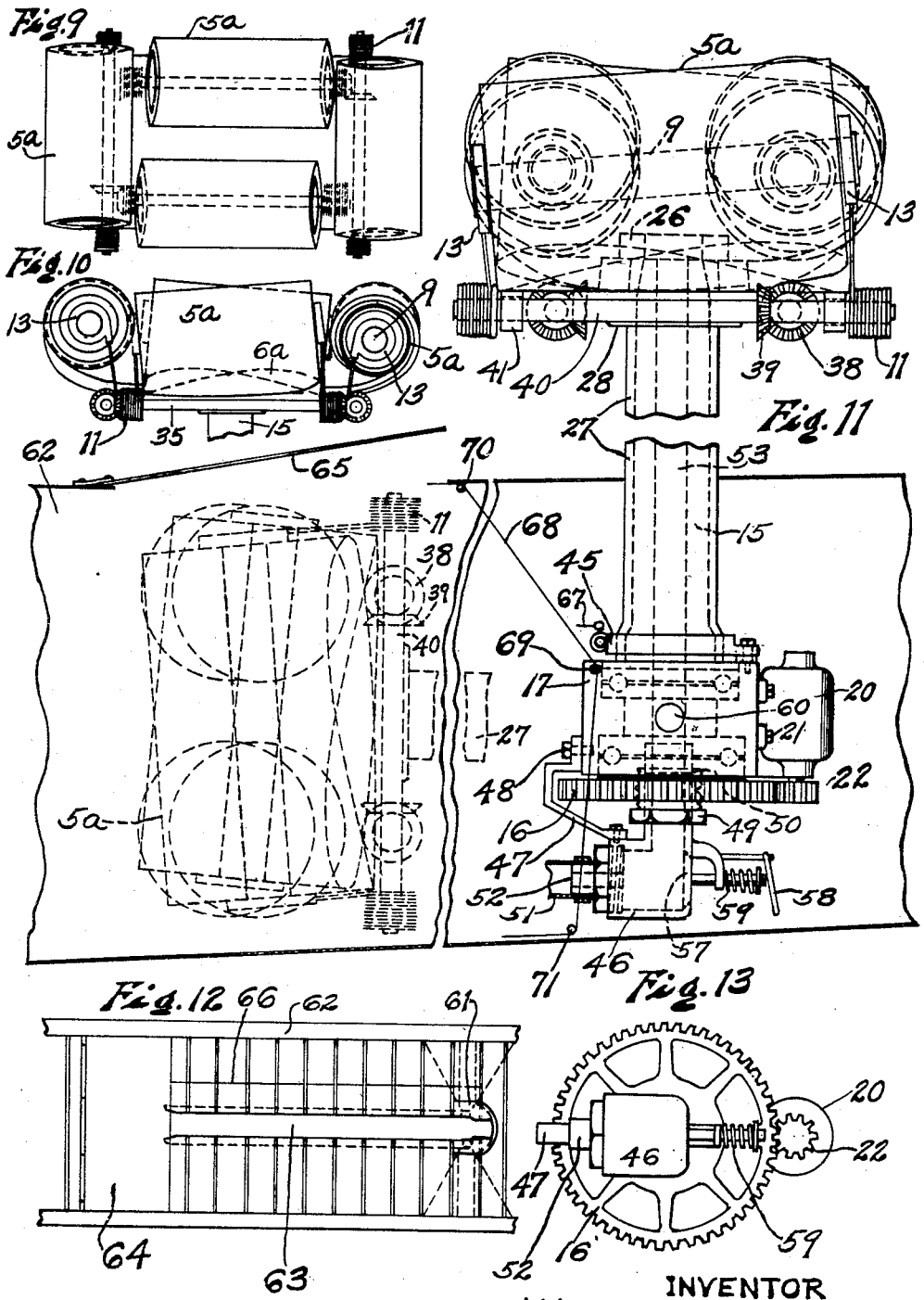

July 28, 1936.  W. J. ROEPKE  2,048,950
AIRCRAFT LIFT ROTOR AND ROTOR PACK
Filed Sept. 29, 1934  4 Sheets-Sheet 4
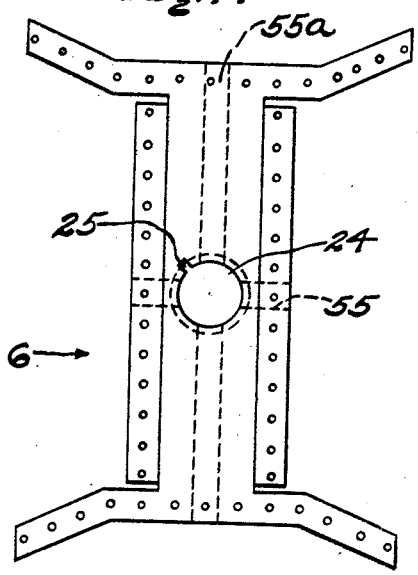
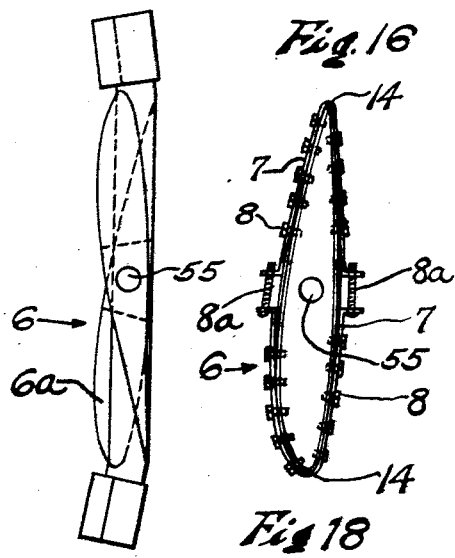
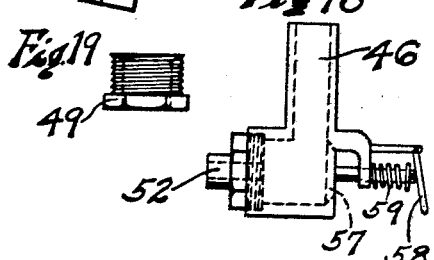
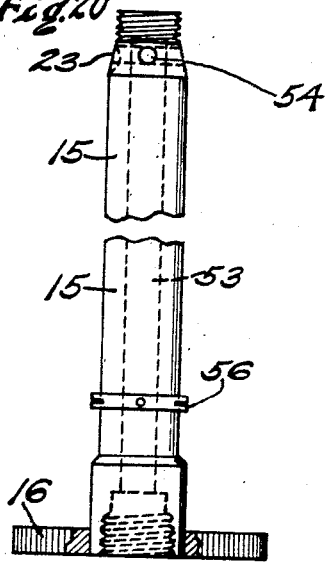
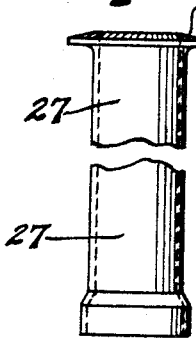
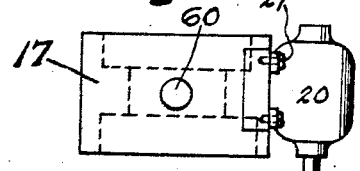
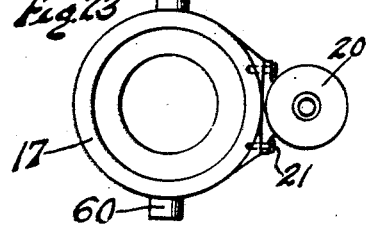
INVENTOR
WILLIAM JOHN ROEPKE
by John A. McDowell
his atty.

Patented July 28, 1936

2,048,950

UNITED STATES PATENT OFFICE 2,048,950

AIRCRAFT LIFT ROTOR AND ROTOR PACK

William John Roepke, Los Angeles, Calif.

Application September 29, 1934, Serial No. 746,109

19 Claims. (Cl. 244—15)

This invention relates to resilient, pneumatic, horizontal rotors for aircraft, made of fabricated rubberized material and means for reinforcing the same; and also includes means for placing, operating and inflating.

Another object of the invention is the provision for deflating and rolling the rotors into a pack, lowering or placing the pack into the airplane out of sight during the flight of the airplane when the rotors are not being used.

The invention includes the rotors and rotor shaft, the raising and lowering, furling and unfurling, inflating and deflating and the power mechanism, also the parts and combination of parts hereinafter described and particularly pointed out in the claims.

This invention makes it possible to lower an airplane from any altitude by simply starting the shaft placing and rotating mechanism which is entirely independent of the power plants. When the rotor shafts have attained the desired speed, the rotors are automatically unfurled and inflated giving them the proper airfoil shape, angle and strength to carry the necessary load.

A feature of this invention is that the rotors are resilient their entire length thus being able to increase or decrease their lift so as to allow for the forward movement of the airplane eliminating the gyroscopic effect.

An advantage of this invention is when the desired altitude has been reached, the rotors can be furled automatically, and the rotor-packs lowered or placed into concealed compartments, so that the speed of the airplane will not be retarded by the drag of the rotors and rotor-packs.

A further object of this invention is to provide means whereby an airplane which is in distress either through disability of its pilot, lack of fuel, through failure of its power plant or plants, failure of one or more of its controls, by reason of fog, storm or darkness, or lack of sufficient space for making an ordinary landing can make a safe perpendicular descent and thereby effect a landing without injury to passengers or pilot or damage to the aircraft.

Another object of this invention is to enable the pilot to unfurl the emergency rotors before takeoff, so as to be assured of a safe getaway and thereby prevent an accident, especially in a restricted area or small field, due generally to the fact that the engine was not properly warmed up before starting. It also would enable a pilot to take off from a small emergency landing field, where otherwise the airplane would have to be dismantled and moved to a larger field.

Another very important object of this invention is to enable an airplane to fly in all kinds of stormy weather, which is now an utter impossibility. With the present modern airplane it is impossible to make a safe takeoff or landing when the visibility is poor owing to the high rate of speed necessary to accomplish this. With the use of my resilient horizontal rotors, the airplane will be able to take off in a shorter space at a much lower rate of speed and land almost perpendicular, with practically no forward speed.

A very essential reason for the adaption of my pneumatic rotor is its light weight, thereby making it unnecessary to reduce the pay load of the airplane, because the rotors weigh little more than the parachutes which are now being carried.

The invention is broadly new, basic and pioneer in that it comprises automatic means whereby pneumatic rotors can be unfurled instantly from the concealed rotor packs by a combination of electric, pneumatic and centrifugal forces so that the aircraft will descend safely in an upright position either at its destination or in an emergency landing.

Another object of the use of my horizontal rotors is to enable an airplane to take off and land safely on a much smaller field; so that landing fields can be located closer to the cities where the cost of the large field would be prohibitive.

An airplane equipped with my horizontal rotors, can hover, or be flown at very low speed, so that it can be used for observation work or reconnoitering, which is often very necessary in searching for objects or forest fires, or spotting artillery fire. When such work is finished, the rotors can be furled automatically out of sight and the airplane can proceed on its destination at high speed.

The use of my horizontal rotors will make for safety and increased air travel, owing to the fact that it will eliminate fear on the part of the public, which is now mostly the reason for the lack of patronage of airplane transportation.

The modern airplane of today is very efficient for speed, but lacks 100% safety when it comes to takeoff and landing; by adding my light rotors, the airplane will possess the combined necessary qualities of speed and safety.

An object of this invention is to dispense entirely with parachutes, which are now compulsary equipment with the U. S. Army and Navy flyers, and are only a makeshift and are cumbersome and impractical, especially for passengers of air transports.

My pneumatic rotor-packs can be unfurled, and inflated instantly, with compressed air or carbon dioxide gas, after the rotor shaft attains the desired speed. An injector can be used which draws pure air with the gas during filling and thus allows the inflation to proceed more rapidly than with the gas alone.

As the rotors are entirely independent of the power plants and are operated by a small motor which derives its current from the storage battery, there can be no possible chance of failure in putting the rotors in operation. As the rotor shafts and rotor-packs attain the desired speed before the rotor blades are unfurled or expanded, it takes very little power or time in putting the rotors in operation.

Other objects, advantages and features of the invention may appear from the accompanying drawings, the subjoined detailed description and the appended claims.

The accompanying drawings illustrate the invention.

Figure 1 is a plan view showing the invention as applied to a low winged monoplane type of aircraft showing the invention in unfurled position.

Fig. 2 is a front elevation of Fig. 1.

Fig. 3 is a front elevation of one wing showing mast and rotor concealed in the wing.

Fig. 4 is a plan view of Fig. 3.

Fig. 5 is a front elevation of the other wing showing the mast up and rotor furled.

Fig. 6 is a plan view of Fig. 5.

Fig. 7 is a fragmental plan view showing one of the rotor blades unfurled and its mechanism, also a part is broken away to show interior construction.

Fig. 8 is a side elevation of Fig. 7.

Fig. 9 is a plan view on a small scale of Fig. 10, showing the rotors furled.

Fig. 10 is a side elevation of Fig. 9.

Fig. 11 is an enlarged fragmental front elevation of the rotor shaft with rotor pack and furling mechanism shown in solid lines in perpendicular position and a fragment of the wing beam broken away to show the power mechanism confined in the wing. The broken lines show the upper portion of the shaft including the rotor pack lying down in the wing when not in use.

Fig. 12 is a fragmental plan view of a wing section, showing the two wing beams, the rotor pack door and the open slot through which the rotor shaft is projected.

Fig. 13 is a plan detail looking from the underside of Fig. 11.

Fig. 14 is an enlarged plan detail view of the rotor head.

Fig. 15 is a side elevation of Fig. 14.

Fig. 16 is a side elevation of the rotor head, showing how the fabric is clamped thereon to form the blade and the fabric being shown in section.

Fig. 17 is an end elevation of Fig. 14.

Fig. 18 is an elevational detail of the air manifold and relief valve.

Fig. 19 is a detail view of the packing gland.

Fig. 20 is an elevational view of the rotor shaft showing how the driving gear is fixed thereon.

Fig. 21 is a fragmental elevational detail view of the rotor sleeve.

Fig. 22 is a detail view of the rotor bearing block with the motor fixed thereto.

Fig. 23 is a plan view of Fig. 22 looking from the underside.

Referring to Figs. 1 and 2, is shown for illustration two units of the horizontal rotor as may be used on this type of aircraft and the number and location of the rotor or rotors depends entirely on the design, size and weight of the aircraft and the number and location of the power plants, so as to have non-interference with the propeller operation.

The invention is shown as applied to a low wing monoplane 1 having twin engines 2 with retractible landing gear 3 and comprises the rotor 4 having vulcanized fabric inflated airfoil rotor-blades 5 provided with an open end that fits over the rotor-head 6 and that is fixed thereto by clamps 7 and bolts 8, thus making a hermetically sealed joint. The opposite end of the rotor-blade 5 is provided with a furling tube 9 integral thereto and the projecting ends 10 form a drum. The outer ends of the furling cables 11 are fixed to the outer ends of the drum 10 as at 12 and are guided on the drum by the sheave 13 when the rotor-blades are being unfurled.

Rotor-blades 5 are constructed similar to a light automobile casing, so they can be rolled into a rotor-pack 5a when deflated, are of an airfoil design which has nearly the same curve on the bottom as on the top, as shown at 6a of the rotor-head 6, so that its center of pressure or lift is nearly the same at all angles and under all air conditions, they are reinforced by flexible cables 14 which run lengthwise through the vulcanized rotor-blade fabric and carry the centrifugal and lifting stresses and one end is fixed to the rotor-head 6 and the other end to the furling tube 9.

A hollow rotor-shaft 15 is provided at its lower end with a large drive gear 16 and is mounted in the rotor bearing block 17 that is provided with the lift bearing 18 and the sleeve support bearing 19.

The rotor bearing block 17 carries the power motor 20 which is fixed thereto by bolts 21. The power motor 20 is provided with a pinion 22 that meshes with the drive gear 16 which rotates the hollow rotor-shaft 15. The top of the rotor-shaft 15 is provided with a tapered ground joint 23 that fits into the tapered ground joint 24 of the rotor-head 6, which is keyed at 25 to the rotor-head 6 and held in place by a nut 26.

A rotor-sleeve 27 fits over the rotor-shaft 15 and is provided at its top with a bevel ring gear 28 integral thereto which meshes into bevel pinions 29 that are supported in the bearings 30 that are fixed to the underside of the rotor-head 6 by bolts 31.

Bevel pinions 29 are provided at their opposite ends with sprockets 32 that drives the sprocket chain 33 to drive-sprockets 34 mounted on the cable winding shafts 35 which are mounted in bearings 36, they being fixed to the underside of the rotor-head 6 by bolts 37. Cable winding shafts 35 are provided with bevel gears 38 that mesh with bevel gears 39 that rotate shafts 40 which are journaled in bearings 41 that are fixed to the underside of the rotor-head 6 by bolts 42.

Furling cables 11 are fixed to the cable shafts 35 and 40 by bolts 43. Cable guards 44 are provided at the ends of shafts 35 and 40.

The rotor-sleeve 27 is provided at its lower end with a brake 45 which decreases and thereby differentiates the speed of the rotor-sleeve from that of the rotor-shaft 15. Thus, through bevel gears 28 which is integral with the rotor-sleeve 27, and bevel gears 29, sprockets 32 and 34, chains 33 turn the cable winding shafts 35 and 40, thereby winding up the furling cables 11 from the cable drums 10. As the cable drum 10 is vulcanized into the outer tip of the rotor-blade 5, the rotor-blade 5 is forced to roll into a pack as the furling cables 11 unwind from the cable drum 10 onto the cable winding shafts 35 and 40.

An air manifold 46 fits into the lower end of the rotor-shaft 15 through which the air or gas is provided for inflating the rotor-blades. As the air manifold 46 is stationary and is fixed to the rotor bearing block 17 by bracket 47 and bolts 48, a packing gland 49 which turns with the rotor-shaft 15 is provided, it slides over the air manifold 46 and is threaded into the rotor-shaft 15 and is sealed by a packing 50.

The air or gas is provided by a container in the usual manner not shown as used at present on naval seaplanes, for inflating rubber boats and inflation bags and is connected by a hose 51 a fragment of which is shown which is fixed to the reducer 52 that is threaded into manifold 46, and then is forced through bore 53 to openings 55 and 55a in the rotor-head 6, into the furled rotor-blades which are unfurled and inflated by the air or gas pressure and centrifugal force.

The rotorshaft 15 is provided with a fixed thrust collar 56, which supports the shaft when the rotors are furled.

A relief valve 57 is provided in the air manifold 46 to permit the escape of the air or gases when the rotor-blades are being furled into a rotor-pack. The relief valve 57 is opened by a lever 58 which compresses the valve spring 59 to which is attached a pull cable 58a, a portion of which is shown, which leads to the control pit.

The rotor bearing block 17 is provided with bosses 60 that swivel in the housing 61 thereby making it possible to move the shaft from a vertical to a horizontal position within the wing section 62.

The slot 63 runs lengthwise in wing section 62 to permit the lowering and concealing of the rotor-shaft and rotor-pack. An opening 64 is provided between the wing beams on wing section 62 to allow for the rotor-pack storage.

A door 65 and a slide 66 are provided in the wing 62 through which the rotor-pack and rotor-shaft are raised and lowered.

To operate the brake 45, a cable 67 is fixed thereto and reaches to the control pit of the ship not shown. To raise and lower the rotor-shaft 15 on pivots 60, a continuous cable 68 is attached to the rotor bearing block 17 at 69 and operates through pulleys 70 and 71 to the pilot pit over a windlass not shown.

When the rotor-shaft 15 on pivot 60 is raised to a position where the rotor-pack clears the wing the power contact starts rotation of the rotor-shaft. By the time the rotor-shaft has reached the upright position it has attained its maximum speed which is above the natural speed. The air is then automatically turned on thereby unfurling and inflating the rotor blades, thus reducing the rotor to its natural speed.

I claim:—

1. An aircraft supporting rotor vane consisting of a hub; of multiple air tight envelopes, fabricated to airfoil rotor shape, reinforced to resist centrifugal and lifting stresses the open ends of the envelopes being adapted and arranged to be attached at a positive angle of incidence to the hub which rotates when in action; and means to inflate the envelopes while so attached and while in action.

2. Horizontal safety rotors for aircraft comprising in combination multiple bladed pneumatic rotors, adapted and arranged to lower or land aircraft; means to deflate and roll the rotor-blades into packs and conceal the packs in the aircraft.

3. Horizontal safety rotors for aircraft comprising in combination, furled packs of multiple bladed pneumatic reinforced rotors adapted and arranged to lower or land aircraft; means to rotate the rotor-blade packs; and means to unfurl the rotor-blade packs and inflate the rotor-blades while they are rotating.

4. An aircraft supporting rotor comprising in combination a rotor-head provided with flexible pneumatic rotor-blades; weighted means fixed to the inflated rotor-blades to produce by means of centrifugal force the proper rigidity and shape when the rotors are in circular motion.

5. The combination of an aircraft supporting rotor; with resilient pliable pneumatic rotor-blades adapted and arranged to be furled into a pack and concealed when not in use and means to unfurl and inflate when in use.

6. An aircraft supporting rotor vane comprising in combination a rotor-shaft, a rotor-head with multiple flexible pneumatic rotor-blades fixed to the rotor-shaft; the rotor-blades adapted and arranged for support of the aircraft; and means to deflate and furl the rotor-blades into a rotor-pack while the rotor blade pack, the rotor-head and rotor-shaft are rotating.

7. An aircraft supporting rotor consisting of a hub with resilient airtight rotor blades set at a positive angle of incidence; means to rotate the hub and rotor blades and means to inflate the rotor blades while they are rotating.

8. An aircraft supporting rotor consisting of a hub; of multiple collapsible rotor blades fixed to the hub at a positive angle of incidence adapted and arranged to rotate when in action while the rotor blades are collapsed; and means to release and project the rotor blades from the hub after the hub is rotating.

9. An aircraft supporting rotor pack consisting of a hub, of multiple flexible rotor blades fixed to and collapsed around the hub; means to rotate the hub and rotor blade pack while collapsed; and means to release and project the collapsed rotor blades from the hub while the hub and rotor blades are rotating.

10. A horizontal flexible aircraft rotor, consisting of a hub with resilient pneumatic rotor blades adapted and arranged for vertical lift while taking off or landing; and cable means attached to the rotor blades for rolling the rotor blades into a rotor pack while the rotor is in circular motion.

11. An aircraft rotor shaft; a rotor head fixed to the rotor shaft provided with multiple flexible rotor blades; rotor blade furling means fixed to the rotor blades, cooperating with rotor blade furling means attached to the rotor head, for rolling the rotor blades into a rotor pack.

12. The combination with an aircraft rotor shaft; a rotor head fixed to the rotor shaft, provided with flexible pneumatic rotor blades; means for furling the rotor blades into a rotor pack while the rotor shaft and rotor blades are rotating; and means to conceal the rotor shaft and rotor pack within the aircraft while the aircraft is in motion.

13. An aircraft rotor pack, comprising in combination, a rotor head furled within flexible rotor blades; a rotor shaft; means to revolve the rotor shaft, rotor head and rotor pack while the rotor shaft is being raised; and means to unfurl the rotor head, and inflate the rotor blades while the rotor shaft, rotor head and rotor pack are rotating.

14. A rotor shaft; a rotor sleeve; a rotor pack consisting of multiple furled rotor blades; means to operate the rotor shaft and rotor sleeve at the same speed while the rotor is unfurled and rotating; means for reducing the speed of the rotor sleeve in relation to the speed of the rotor shaft for furling the rotor blades; and means to rotate the rotor sleeve at a faster speed than the rotor shaft while the rotor blades are being unfurled.

15. A hollow rotor shaft; a rotor head with multiple pneumatic rotor blades rolled inside a rotor pack fixed to the hollow rotor shaft, air or gas supply connected to the hollow rotor shaft; and means for injecting air or gas into the furled rotor blade pack through the hollow rotor shaft, while the hollow rotor shaft the rotor head and rotor pack are rotating and the rotor blades are unfurling from the rotor pack.

16. An aircraft supporting rotor vane, comprising in combination, a rotor shaft, a rotor head with multiple flexible rotor blades, the rotor blades rolled into a rotor pack; rotor shaft power mechanism adapted and arranged to rotate the rotor shaft, rotor head and rotor pack; means to unfurl the rotor pack into rotor blades after the rotor shaft, rotor head and rotor pack are rotating; and means to inflate the rotor blades while the rotor blade pack is rotating and being unfurled.

17. An aircraft supporting rotor vane, comprising in combination, a rotor shaft, a rotor head with multiple flexible pneumatic rotor-blades, fixed to the rotor shaft; the rotor blades while in circular motion adapted and arranged for support of the aircraft; and means to deflate and furl the rotor blades into a rotor pack, while the rotor blade pack, the rotor head and rotor shaft are rotating.

18. An aircraft supporting rotor, consisting of a rotor head with multiple collapsible rotor blades; dual cable winding means for furling and releasing the rotor blades, one located near the tip and the other near the root of the rotor blade, adapted and arranged to wind the cable alternately from one shaft to the other, so as to furl the rotor blades into a rotor pack and release them from the rotor pack.

19. An aircraft rotor vane consisting of a rotor head with multiple pneumatic rotor blades; cable furling and centrifugal weight means fixed near the outer tips of the rotor blades, used for the dual purpose of furling the rotor blades and placing the desired weight for centrifugal pull near the outer ends of the rotor blades while they are unfurled.

WILLIAM JOHN ROEPKE.